United States Patent
Sato et al.

(10) Patent No.: US 11,324,071 B2
(45) Date of Patent: May 3, 2022

(54) MOBILE STATION APPARATUS (71) Applicants: SHARP KABUSHIKI KAISHA, Sakai (JP); FG Innovation Company Limited, Tuen Mun (HK)

(72) Inventors: Seiji Sato, Sakai (JP); Jungo Gotoh, Sakai (JP); Osamu Nakamura, Sakai (JP); Shohei Yamada, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/967,711

(22) PCT Filed: Feb. 5, 2019

(86) PCT No.: PCT/JP2019/004091
§ 371 (c)(1),
(2) Date: Aug. 5, 2020

(87) PCT Pub. No.: WO2019/156083
PCT Pub. Date: Aug. 15, 2019

(65) Prior Publication Data
US 2021/0045184 A1 Feb. 11, 2021

(30) Foreign Application Priority Data
Feb. 7, 2018 (JP) .............................. JP2018-020101

(51) Int. Cl.
*H04W 76/34* (2018.01)
*H04W 72/14* (2009.01)
(Continued)

(52) U.S. Cl.
CPC ....... *H04W 76/38* (2018.02); *H04W 72/1268* (2013.01); *H04W 72/14* (2013.01); *H04W 76/34* (2018.02)

(58) Field of Classification Search
None
See application file for complete search history.

(56) References Cited

U.S. PATENT DOCUMENTS 9,363,059 B2 *  6/2016  Wang .................... H04L 5/0057
2010/0232376 A1  9/2010  Wu
(Continued)

FOREIGN PATENT DOCUMENTS

JP   2010-220215 A   9/2010
WO  2019/050293 A1  3/2019

OTHER PUBLICATIONS

3GPP TS 36.300 V14.3.0 (Jun. 2017) 3rd Generation Partnership Project; Technical Specification Group Radio AccessNetwork; Evolved Universal Terrestrial Radio Access (E-UTRA) and Evolved Universal Terrestrial Radio Access Network (E-UTRAN); Overall description; Stage 2(Release 14).

(Continued)

*Primary Examiner* — Kenny S Lin
(74) *Attorney, Agent, or Firm* — ScienBiziP, P.C.

(57) ABSTRACT

There is a concern that communication failure may occur in a case that the state of a serving cell is not properly managed during communication of SPS or GF. A mobile station apparatus of a communication system including at least a base station apparatus and a mobile station apparatus configured to perform communication by using carrier aggregation that simultaneously uses multiple serving cells configured by the base station apparatus according to an aspect of the present invention, wherein the mobile station apparatus restarts a deactivation timer of a serving cell of the (Continued)

multiple serving cells at a timing indicated by a configured uplink grant configured for the serving cell.

2 Claims, 10 Drawing Sheets

(51) Int. Cl.
*H04W 76/38* (2018.01)
*H04W 72/12* (2009.01)

(56) References Cited

U.S. PATENT DOCUMENTS

| | | | | |
|---|---|---|---|---|
| 2013/0114398 | A1* | 5/2013 | Wang | H04W 76/28 |
| | | | | 370/221 |
| 2013/0188613 | A1* | 7/2013 | Dinan | H04W 36/0072 |
| | | | | 370/336 |
| 2016/0128003 | A1* | 5/2016 | Callender | H04W 24/02 |
| | | | | 370/311 |
| 2016/0270107 | A1* | 9/2016 | Dinan | H04L 5/001 |
| 2017/0048734 | A1* | 2/2017 | Kusashima | H04W 52/02 |
| 2017/0055242 | A1* | 2/2017 | Kusashima | H04L 5/0092 |
| 2017/0086172 | A1* | 3/2017 | Dinan | H04W 72/0453 |
| 2017/0150387 | A1* | 5/2017 | Fujishiro | H04W 72/085 |
| 2018/0027461 | A1* | 1/2018 | Jia | H04W 72/04 |
| | | | | 370/329 |
| 2018/0077644 | A1* | 3/2018 | Dinan | H04W 52/0216 |
| 2018/0139734 | A1* | 5/2018 | Babaei | H04W 72/0406 |
| 2019/0075550 | A1* | 3/2019 | Lee | H04W 72/02 |
| 2019/0182855 | A1* | 6/2019 | Babaei | H04W 72/042 |

OTHER PUBLICATIONS

3GPP TS38.300 V2.0.0 (Dec. 2017) 3rd Generation Partnership Project; Technical Specification Group Radio Access Network; NR; NR and NG-RAN Overall Description; Stage 2 (Release 15).

LG Electronics Inc. "Restart condition of sCellDeactivationTimer with skipping operation", R2-1801277, 3GPP TSG-RAN WG2 NR Ad Hoc #3, Vancouver, Canada, Jan. 22-26, 2018.

Ericsson, "SPS and BWP inactivity timer interaction", R2-1800334, 3GPP TSG-RAN WG2 #AH NR 1801, Vancouver, Canada, Jan. 22-26, 2018.

LG Electronics Inc., "Restart condition of sCellDeactivationTimer with skipping operation", R2-1801279 3GPP TSG-RAN WG2 NR Ad Hoc #3, Vancouver, Canada, Jan. 22-26, 2018.

HTC, "RAR with Uplink grant for SCell and ScellDeactivationTimer", R2-122478 3GPP TSG-RAN WG2 Meeting #78, May 21-25, 2012, Prague, Czech Republic.

* cited by examiner

MOBILE STATION APPARATUS

TECHNICAL FIELD

An aspect of the present invention relates to a mobile station apparatus.

This application claims priority based on JP 2018-20101 filed in Japan on Feb. 7, 2018, the contents of which are incorporated herein by reference.

BACKGROUND ART

A standardization organization of 3rd Generation Partnership Project (3GPP) have standardized specifications of Evolved Universal Terrestrial Radio Access (also referred to "EUTRA" or "LTE") to which the third generation mobile communication system has been evolved and Advanced EUTRA (also referred to as "LTE-Advanced" or "LTE-A") to which SUTRA has further been evolved as the fourth generation mobile communication system and mobile communications using such specifications are commercialized in countries (NPL 1). In recent years, the technology of the fifth generation mobile communication scheme has been studied and standardized in 3GPP (NPL 2).

As one of scheduling (communication resource allocating) technologies, there is a method for periodical allocation of communication resources using Semi-Persistent Scheduling (SPS). Unlike dynamic scheduling in which communication resources are allocated by using signaling called an uplink grant or a downlink assignment for each subframe, this is a technology in which communication resources are allocated by a predetermined configuration (time interval, modulation scheme, start timing, the number of repetitions, or the like) to omit the uplink grant and the downlink assignment, thus enabling efficient communication by decreasing overheads caused by control signals. While SPS has been employed also in the existing technologies of and LTE-Advanced and used for real-time communications such as a communication of a voice service, studies and standardization of specifications thereof for further evolution of SPS have progressed also in the 5G mobile communication system. Studies and standardization of specifications of an uplink Grant Free (GF) communication system have progressed that enables, by applying uplink SPS, uplink data transmission from a mobile station apparatus to a base station apparatus without an uplink grant allocated from the base station apparatus to the mobile station apparatus.

CITATION LIST

Non Patent Literature

NPL 1: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)" 3GPP TS 36.300 V14.3.0 (2017 June)

NPL 2: "3rd Generation Partnership Project; Technical Specification Group Radio Access Network; NR; NR and NG-RAN Overall Description; Stage 2 (Release 15)" 3GPP TS 38.300 V2.0.0 (2017 December)

SUMMARY OF INVENTION

Technical Problem

There is a concern that communication failure may occur in a case that the state of a serving cell is not properly managed during communication by SPS or GF.

An aspect of the present invention has been made in view of such circumstances, and an object of the present invention is to provide a mobile station apparatus capable of appropriately managing the state of the serving cell and successfully communicating even during the communication by SPS or GF.

Solution to Problem (1) An aspect of the present invention has been made to solve the above-described problems, and is a mobile station apparatus of a communication system including at least a base station apparatus and a mobile station apparatus configured to perform communication by using carrier aggregation that simultaneously uses multiple serving cells configured by the base station apparatus according to an aspect of the present invention, wherein the mobile station apparatus restarts a deactivation timer of a serving cell of the multiple serving cell at a timing indicated by a configured uplink grant configured for the serving cell.

(2) A mobile station apparatus according to an aspect of the present invention is the mobile station apparatus described above, wherein in a case that uplink data is transmitted at the timing indicated by the configured uplink grant configured for the serving cell, the mobile station apparatus further restarts the deactivation timer of the serving cell.

(3) An aspect of the present invention is a mobile station apparatus of a communication system including at least a base station apparatus and the mobile station apparatus configured to perform communication by using carrier aggregation that simultaneously uses multiple serving cells configured by the base station apparatus according to an aspect of the present invention, wherein the mobile station apparatus stops a deactivation timer of a serving cell of the multiple serving cell in a case that a configured uplink grant is configured for the serving cell, and restarts the deactivation timer of the serving cell in a case that the configured uplink grant is released.

(4) A mobile station apparatus according to an aspect of the present invention is the mobile station apparatus described above, wherein in a case that a downlink control signal for performing activation of the configured uplink grant is received from the base station apparatus, the mobile station apparatus further stops the deactivation timer of the serving cell.

(5) A mobile station apparatus according to an aspect of the present invention is the mobile station apparatus described above, wherein in a case that a downlink control signal for performing deactivation of the configured uplink grant is received from the base station apparatus, the mobile station apparatus further starts the deactivation timer of the serving cell.

(6) A mobile station apparatus of a communication system including at least a base station apparatus and the mobile station apparatus configured to perform communication by using carrier aggregation that simultaneously uses multiple serving cells configured by the base station apparatus according to an aspect of the present invention, wherein the mobile station apparatus restarts a deactivation timer of a serving cell of the multiple serving cell at a timing indicated by a configured downlink assignment configured for the serving cell.

(7) A mobile station apparatus according to an aspect of the present invention is the mobile station apparatus described above, wherein in a case that downlink data is received at the timing indicated by the configured downlink assignment configured for the serving cell, the mobile station apparatus further restarts the deactivation timer of the serving cell.

(8) An aspect of the present invention is a mobile station apparatus of a communication system including at least a base station apparatus and the mobile station apparatus configured to perform communication by using carrier aggregation that simultaneously uses multiple serving cells configured by the base station apparatus according to an aspect of the present invention, the mobile station apparatus stops a deactivation timer of a serving cell of the multiple serving cell in a case that a configured downlink assignment is configured for the serving cell; and starts the deactivation timer of the serving cell in a case that the configured downlink assignment is released.

Advantageous Effects of Invention

According to an aspect of the present invention, the state of a serving cell can be appropriately managed and communication can be performed successfully even during communication by SPS or GF.

DESCRIPTION OF EMBODIMENTS

First Embodiment

Figure 1:
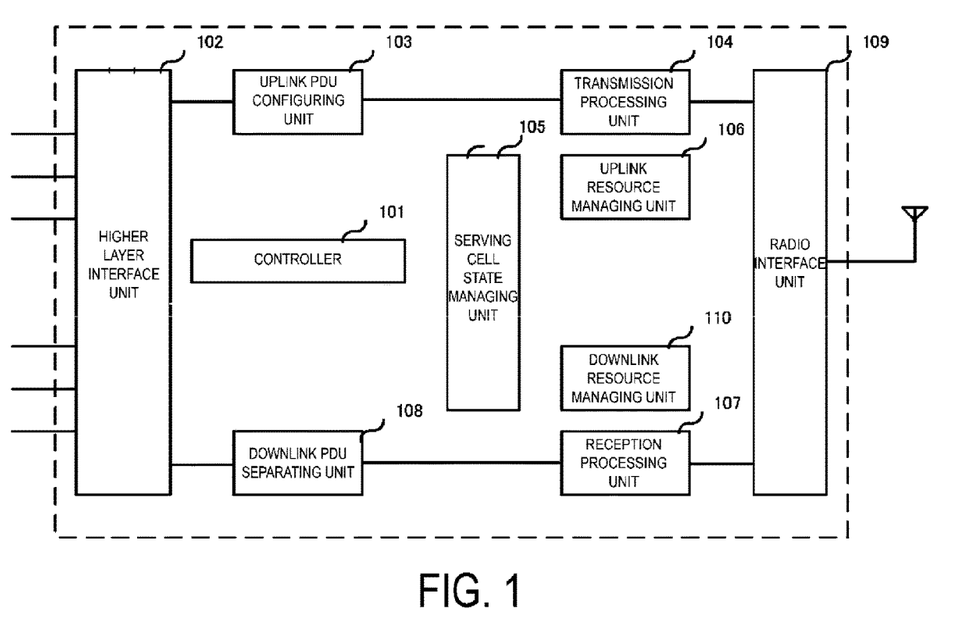
FIG. 1 is a diagram illustrating an example of a configuration of a MAC entity in a mobile station apparatus according to an aspect of the present invention.

Hereinafter, a first embodiment which is an aspect of the present invention will be described in detail with reference to the drawings. FIG. 1 illustrates an example of a configuration of a MAC entity in a mobile station apparatus according to the present embodiment. In FIG. 1, reference sign 101 represents a controller that controls all the components, Reference sign 102 represents a higher layer interface unit, which configures and manages logical channels with higher layers such as the PDCP, the RLC, and the RRC and transmits uplink data and/or receives downlink data through the logical channels. Reference sign 103 represents an uplink Protocol Data Unit (PDU) configuring unit, which configures an uplink PDU by adding a header to uplink transmission data from a higher layer received through a logical channel, combines data of multiple logical channels, and the like. Reference sign 104 represents a transmission processing unit, Which performs an error correction coding process, a modulation process, or the like on an uplink PDU generated by the uplink PDU configuring unit 103 and performs mapping to an uplink physical resource indicated from an uplink resource managing unit 106. Reference sign 105 represents a serving cell state managing unit, which manages the state for all serving cells that have been allocated to the mobile station apparatus. An uplink resource managing unit 106 manages uplink physical resources allocated from a base station apparatus and controls mapping between uplink PDUs and uplink physical resources. A reception processing unit 107 performs demodulation or decoding of an error correction code for a signal received from a radio interface unit 109 and reconfigures a downlink PDU. A downlink PDU separating unit 108 separates a downlink PDU received from the reception processing unit 107 into one or multiple pieces of data, transmits user data and control data to a higher layer through the higher layer interface unit 102, and transmits Control Element (CE) data to the controller 101, Reference sign 110 represents a downlink resource managing unit, which manages downlink physical resources allocated from a base station apparatus. The radio interface unit 109 transmits and/or receives radio signals to and/or from a base station apparatus.

While an uplink grant for dynamic scheduling is referred to as a dynamic grant, and an uplink grant of SPS and GF in the uplink is referred to as a configured grant or a configured uplink grant in terms of the meaning that the allocation of communication resources is performed according to a predetermined configuration. Similarly, the downlink SPS is referred to as a configured assignment or a configured downlink assignment. 3GPP has been standardizing specifications for a fifth generation mobile communication scheme, and it is expected that the uplink SPS, the GF, and the downlink SPS will collectively be referred to as "Transmission/Reception without dynamic scheduling", the downlink SPS will be referred to as "DL-SPS", and the GF and the uplink SPS will be referred to as "configured grant Type 1" and "configured grant Type 2" respectively. Note that in the following description, for convenience, "configured grant Type 1" is described as GF, "configured grant Type 2" is described as UL-SPS, and the downlink SPS is described as DL-SPS.

In LIE and LTE-A, the configuration of the UL-SPS and the DL-SPS has only been allowed to be configured on the primary cell (PCell) and the primary secondary cell (PSCell) which are referred to as special cells (SpCell), but in the fifth generation communication scheme of 3GPP, the DL-SPS, the UL-SPS, and the GF can be configured on a secondary cell (SCell). The secondary cell is controlled by the network to be in an active state or an inactive state, and neither transmission nor reception is performed in the inactive state. Activation to activate and deactivation to deactivate the secondary cell is indicated by the SCell Activation/Deactivation MAC Control Element (CE) transmitted from the base station apparatus to the mobile station apparatus. Furthermore, an SCell deactivation timer (sCellDeactivationTimer) is configured for each secondary cell. The sCellDeactivationTimer is started or restarted in a case that the SCell Activation/Deactivation MAC CE for indicating activation or deactivation of the secondary cell is received from the base station apparatus. The sCellDeactivationTimer is restarted also in a case that an uplink grant or a downlink assignment is received on a Physical Downlink Control CHannel (PDCCH) of the secondary cell, or in a case that an uplink grant or a downlink assignment for the secondary cell is received on a PDCCH of another serving cell. In a case that the sCellDeactivationTimer expires, the secondary cell to which the sCellDeactivationTimer is configured is deactivated, and until the secondary cell is activated next time, either control signal and data transmission on the uplink or control signal and data reception on the downlink is not performed at all.

Note that, in a case that multiple Bandwidth Parts (BWPs) are configured on the serving cell, and in a case that a downlink BWP other than the default downlink IMP (the initial downlink BWP in a case that a default downlink BWP is not configured) is in the active state, the BWP inactivity timer (bandwidthPartInactivityTimer) is configured and started. The BWP inactivity timer is restarted in a case that an uplink grant or a downlink assignment is received on the Physical Downlink Control CHannel (PDCCH) of the active downlink BWP for which the BWP inactivity timer is configured, but the BWP inactivity timer is not restarted in a case that an uplink grant or a downlink assignment for the active downlink BWP is received on a PDCCH of another serving cell. In a case that the BWP inactivity timer expires, the downlink BWP for Which the BWP inactivity timer is configured is switched to the default downlink BWP (the initial downlink IMP in a case that a default downlink BWP is not configured), and communication on the serving cell is continued. Note that the BWP is configured in each of the uplink and the downlink, and the uplink BWP and the downlink BWP are paired on a one-to-one basis, and in a case that the downlink BWP is switched, the uplink IMP that is paired is also switched.

However, in a case that the secondary cell is configured with DL-SPS, UL-SPS, or GF and the communication using them is activated, the mobile station apparatus does not receive an uplink grant or a downlink assignment related to them on the PDCCH and the sCellDeactivationTimer is not restarted, and thus there is a concern that the sCellDeactivationTimer expires during communication, which may deactivate the secondary cell and cause communication failure.

In view of the problems described above, an aspect of the present invention takes an approach to prevent unintended deactivation of a secondary cell even in a case that the secondary cell is configured with DL-SPS, UL-SPS or GF and even during communication using them.

Figure 2:
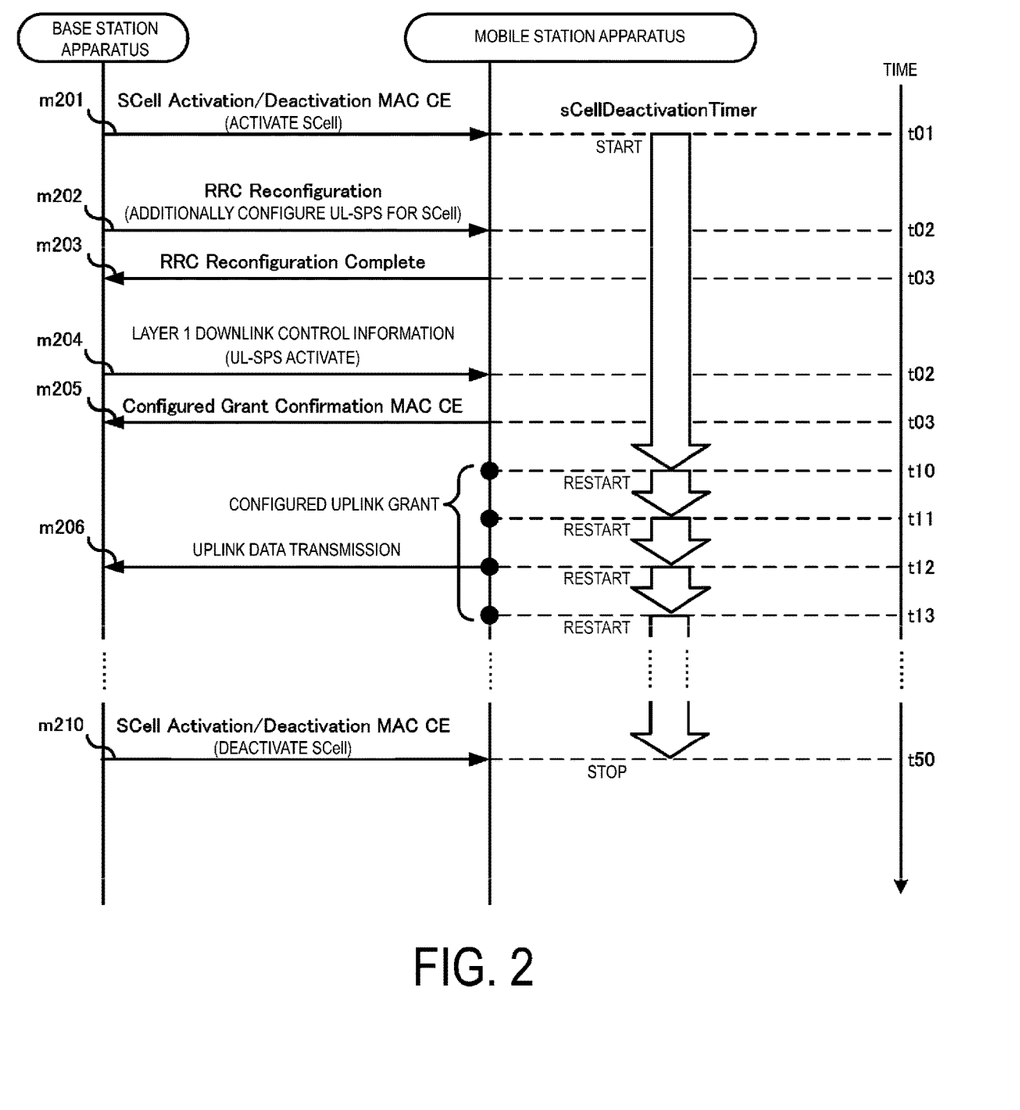
FIG. 2 is a diagram illustrating an example flow of transmission and/or reception of messages and data of a base station apparatus and a mobile station apparatus at each time, and a method for managing an sCellDeactivationTimer in a case of applying to UL-SPS according to an aspect of the present invention.

As an aspect of the present invention, an example flow of transmission and/or reception of messages and data of a base station apparatus and a mobile station apparatus at each time, and a method for managing an sCellDeactivationTimer in a case of applying to UL-SPS will be described with reference to FIG. 2. First, a message m201 (SCell Activation/Deactivation MAC CE) for indicating an activation of the SCell is transmitted at time t01 from the base station apparatus to the mobile station apparatus. The mobile station apparatus having received the message m201 activates the SCell and starts the sCellDeactivationTimer. Next, a message m202 (RRC Reconfiguration) for additionally configuring the UL-SPS for the SCell is transmitted at time t02 from the base station apparatus to the mobile station apparatus. The mobile station apparatus having received the message m202 performs processing for configuring the UL-SPS on the SCell, and transmits a response message m203 (RRC Reconfiguration Complete) in response to the message m202 to the base station apparatus at time t03. Next, at time t04, layer 1 downlink control information m204 for activating the UL-SPS configured on the SCell is transmitted from the base station apparatus to the mobile station apparatus. The mobile station apparatus having received the layer 1 downlink control information m204 activates the configured uplink grant of the UL-SPS and transmits a response message m205 (Configured Grant Confirmation MAC CE) to the base station apparatus at time t05. Note that, in the transmission and/or reception timing (t02 to t05) from the messages m202 to m205, the sCellDeactivationTimer may be restarted. Then, a configured uplink grant is generated at each timing (t10, t11, t12, t13) configured by the message m202. Note that, although the generation of the configured uplink grant is illustrated only up to t13 in FIG. 2, the generation of the configured uplink grant continues after t13 until the UL-SPS is deactivated next time. In a case that the configured uplink grant is generated, the mobile station apparatus restarts the sCellDeactivationTimer. Then, at time t50, the base station apparatus transmits a message m210 (SCell Activation/Deactivation MAC CE) for deactivating the SCell to the mobile station apparatus. The mobile station apparatus having received the message m210 deactivates the SCell and stops sCellDeactivationTimer.

Figure 3:
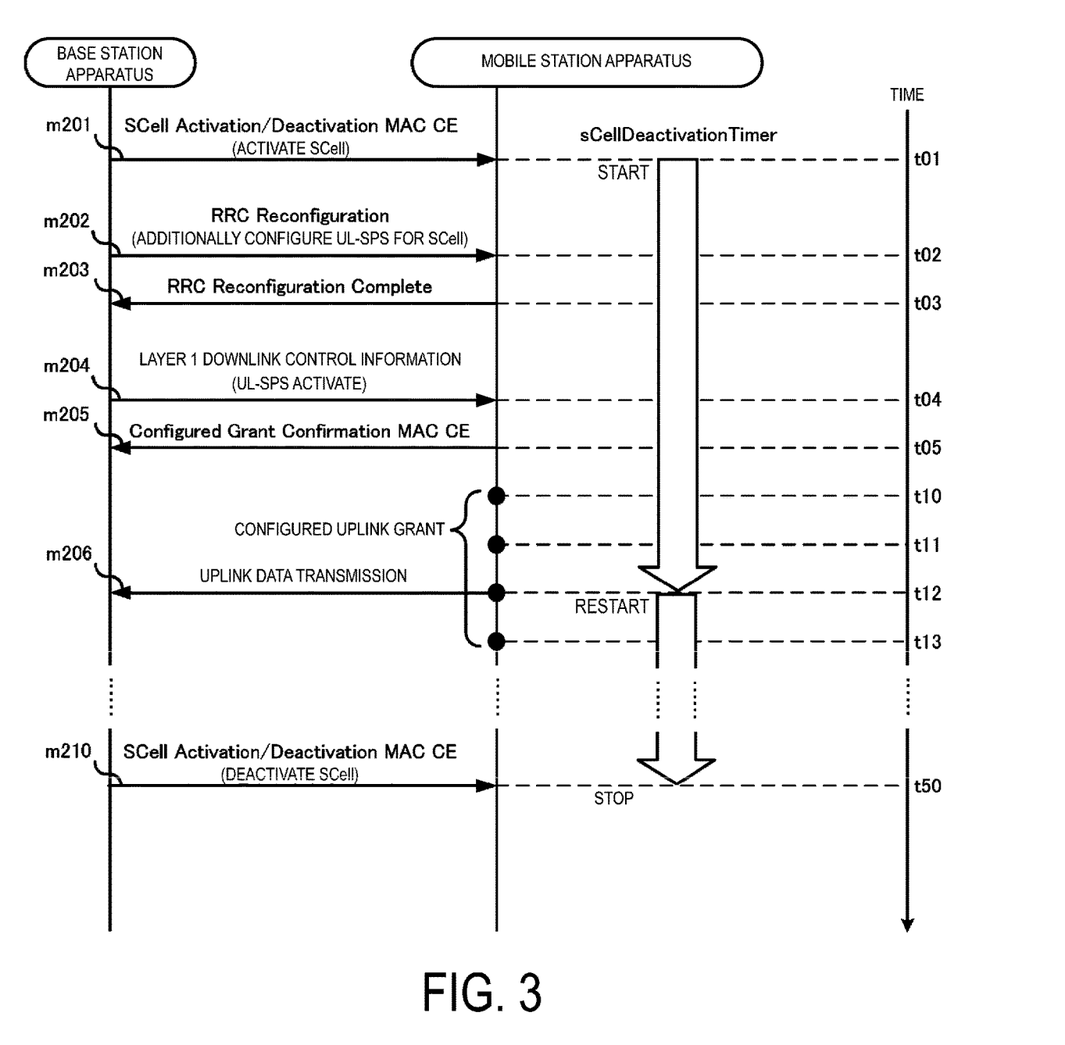
FIG. 3 is a diagram illustrating an example flow of transmission and/or reception of messages and data of a base station apparatus and a mobile station apparatus at each time, and a method for managing an sCellDeactivationTimer in a case of applying to UL-SPS according to an aspect of the present invention.

Note that, as illustrated in FIG. 3, the sCellDeactivationTimer may be restarted only at timing (t12) at which the configured uplink grant is generated and uplink data transmission (message m206) to the base station apparatus is performed. Each message (SCell Activation/Deactivation MAC CE, RRC Reconfiguration, RRC Reconfiguration Complete, Configured Grant Confirmation MAC CE) is not limited thereto, and other messages may be used as long as they include content for indicating or responding with equivalent operations.

As described above, by applying an aspect of the present invention, the state of a secondary cell can be appropriately managed and unintended cessation of communication can be prevented even during UL-SPS communication on the secondary cell.

Second Embodiment

Next, as an aspect of the present invention, an example of a procedure in a case of applying to GF will be explained as a second embodiment.

Figure 4:
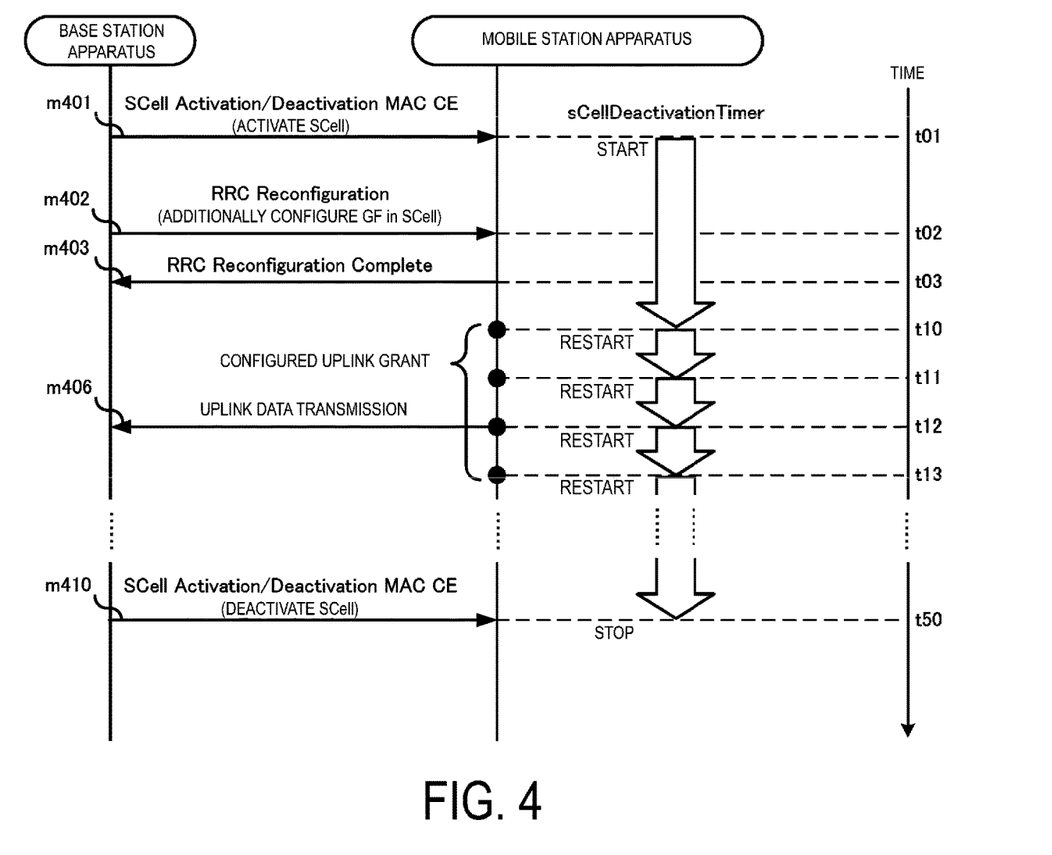
FIG. 4 is a diagram illustrating an example flow of transmission and/or reception of messages and data of a base station apparatus and a mobile station apparatus, and a method for managing an sCellDeactivationTimer in a case of applying to GF according to an aspect of the present invention.

FIG. 4 illustrates an example flow of transmission and/or reception of messages and data of a base station apparatus and a mobile station apparatus at each time, and a method for managing an sCellDeactivationTimer according to the present embodiment. The messages m401, m403, m406, and m410 are similar to the messages m201, m203, m206, and m210 in FIG. 2, and the descriptions thereof will be omitted. The message m202 (RRC Reconfiguration) is transmitted from the base station apparatus to the mobile station apparatus to additionally configure GF for the SCell. Then, a configured uplink grant is generated at each timing (t10, t11, t12, t13) configured by the message m402. Note that, although the generation of the configured uplink grant is illustrated only up to t13 in FIG. 4, the generation of the configured uplink grant continues after t13 until the GF is released next time. In a case that the configured uplink grant is generated, the mobile station apparatus restarts the sCellDeactivationTimer. Then, at time t50, the base station apparatus transmits a message m410 (SCell Activation/Deactivation MAC CE) for deactivating the SCell to the mobile station apparatus. The mobile station apparatus having received the message m410 deactivates the SCell and stops sCellDeactivationTimer.

Figure 5:
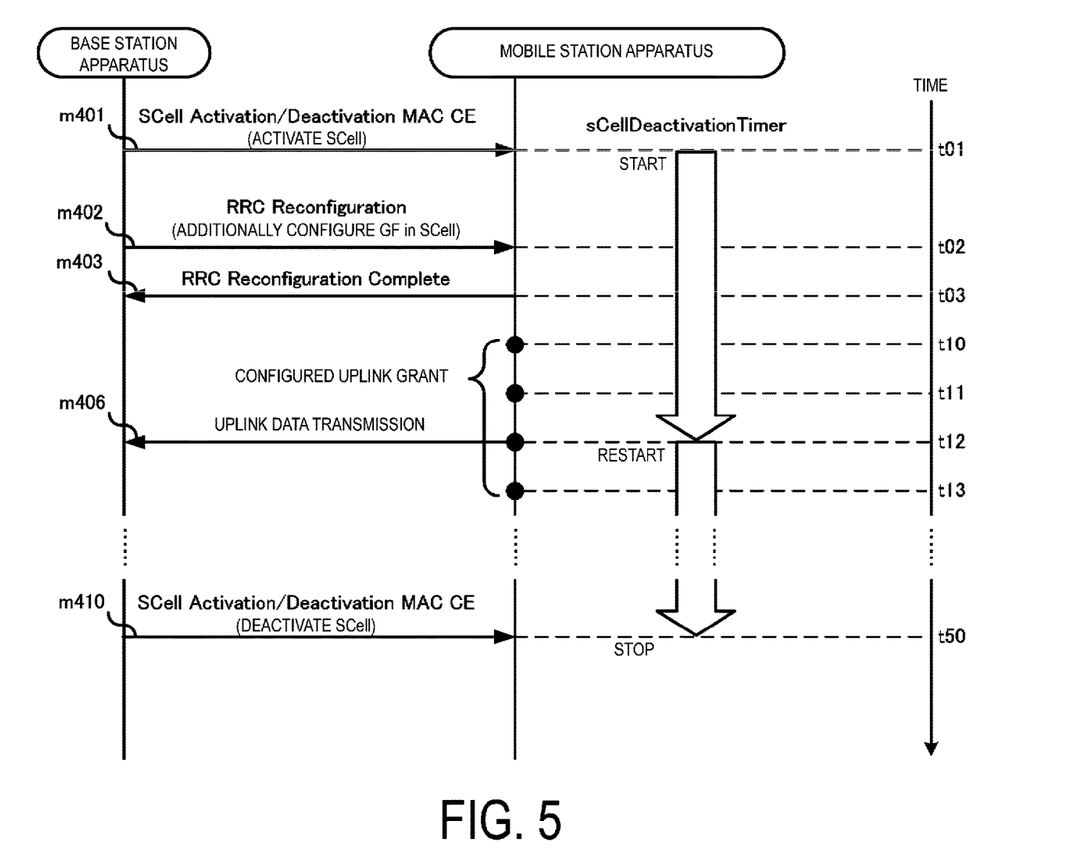
FIG. 5 is a diagram illustrating an example flow of transmission and/or reception of messages and data of a base station apparatus and a mobile station apparatus, and a method for managing an sCellDeactivationTimer in a case of applying to GF according to an aspect of the present invention.

Note that, as illustrated in FIG. 5, the sCellDeactivationTimer may be restarted only at timing (t12) at which the configured uplink grant is generated and uplink data transmission (message m406) to the base station apparatus is performed. Each message (SCell Activation/Deactivation MAC CE, RRC Reconfiguration, RRC Reconfiguration Complete, Configured Grant Confirmation MAC CE) is not limited thereto, and other messages may be used as long as they include content for indicating or responding with equivalent operations. Restart of the sCellDeactivationTimer may be performed at the transmission and/or reception timing (t02, t03) of the message m402 or 403, or both.

As described above, by applying an aspect of the present invention, the state of a secondary cell can be appropriately managed and unintended cessation of communication can be prevented even during GF communication on the secondary cell.

Third Embodiment

Figure 6:
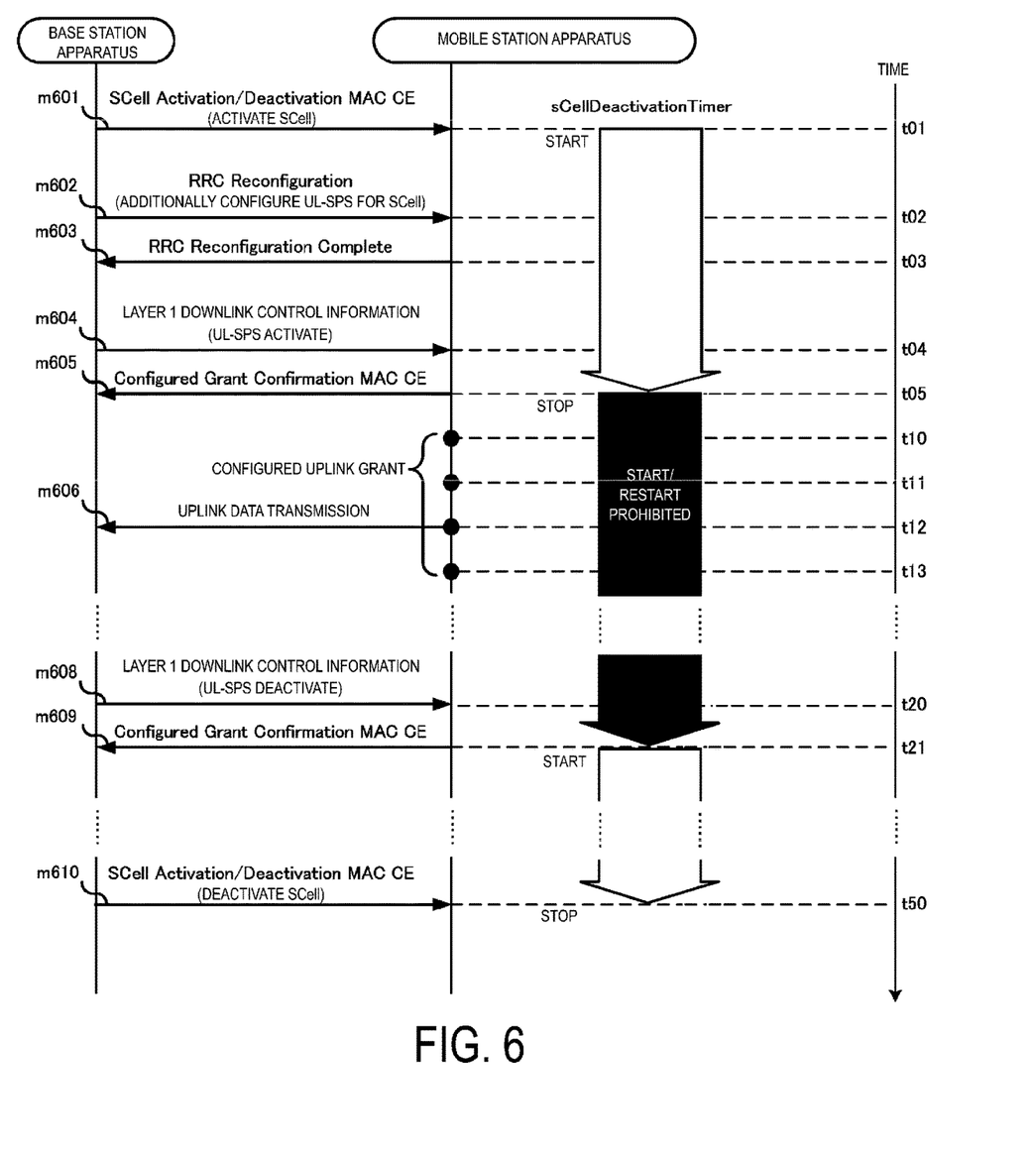
FIG. 6 is a diagram illustrating an example flow of transmission and/or reception of messages and data of a base station apparatus and a mobile station apparatus, and a method for managing an sCellDeactivationTimer in a case of stopping the sCellDeactivationTimer during UL-SPS communication according to an aspect of the present invention.

Next, as an aspect of the present invention, a procedure for stopping the sCellDeactivationTimer during UL-SPS communication will be described as a third embodiment, FIG. 6 illustrates an example flow of transmission and/or reception of messages and data of a base station apparatus and a mobile station apparatus at each time, and a method for managing an sCellDeactivationTimer according to the present embodiment. First, a message m601 (SCell Activation/Deactivation MAC CE) for indicating an activation of the SCell is transmitted at time t01 from the base station apparatus to the mobile station apparatus. The mobile station apparatus having received the message m601 activates the SCell and starts the sCellDeactivationTimer. Next, a message m602 (RRC Reconfiguration) for additionally configuring the UL-SPS for the SCell is transmitted at time t02 from the base station apparatus to the mobile station apparatus. The mobile station apparatus having received the message m602 performs processing for configuring the UL-SPS on the SCell, and transmits a response message m603 (RRC Reconfiguration Complete) in response to the message m602 to the base station apparatus at time t03. Next, at time t04, layer 1 downlink control information m604 for activating the UL-SPS configured on the SCell is transmitted from the base station apparatus to the mobile station apparatus. The mobile station apparatus having received the layer 1 downlink control information m604 activates the configured uplink grant of the UL-SPS and transmits a response message m605 (Configured Grant Confirmation MAC CE) to the base station apparatus at time t05, and then stops the sCellDeactivationTimer and causes the sCellDeactivationTimer to be in an start/restart prohibition state. In a case that the sCellDeactivationTimer is in the start/restart prohibition state, the sCellDeactivationTimer is not started or restarted in any case that transmission of uplink data and control information or reception of downlink data and control information is performed on the SCell configured as such. Then, in a case that the layer 1 downlink control information m608 for deactivating the UL-SPS configured on the SCell is transmitted at time t20 from the base station apparatus to the mobile station apparatus, the mobile station apparatus deactivates the configured uplink grant of the UL-SPS of the SCell, transmits a response message m605 (Configured Grant Confirmation MAC CE) to the base station apparatus at time t21, and releases the start/restart prohibition state of the sCellDeactivationTimer to start the sCellDeactivationTimer. Then, at time t50, the base station apparatus transmits a message m610 (SCell Activation/Deactivation MAC CE) for deactivating the SCell to the mobile station apparatus. The mobile station apparatus having received the message m610 deactivates the SCell and stops sCellDeactivationTimer.

Note that each message (SCell Activation/Deactivation MAC CE, RRC Reconfiguration, RRC Reconfiguration Complete, Configured Grant Confirmation MAC GE) is not limited thereto, and other messages may be used as long as they include content for indicating or responding with equivalent operations.

As described above, by applying an aspect of the present invention, the state of a secondary cell can be appropriately managed and unintended cessation of communication can be prevented even during UL-SPS communication on the secondary cell.

Fourth Embodiment

Next, as an aspect of the present invention, a procedure for stopping the sCellDeactivationTimer during GF communication will be described as a fourth embodiment.

Figure 7:
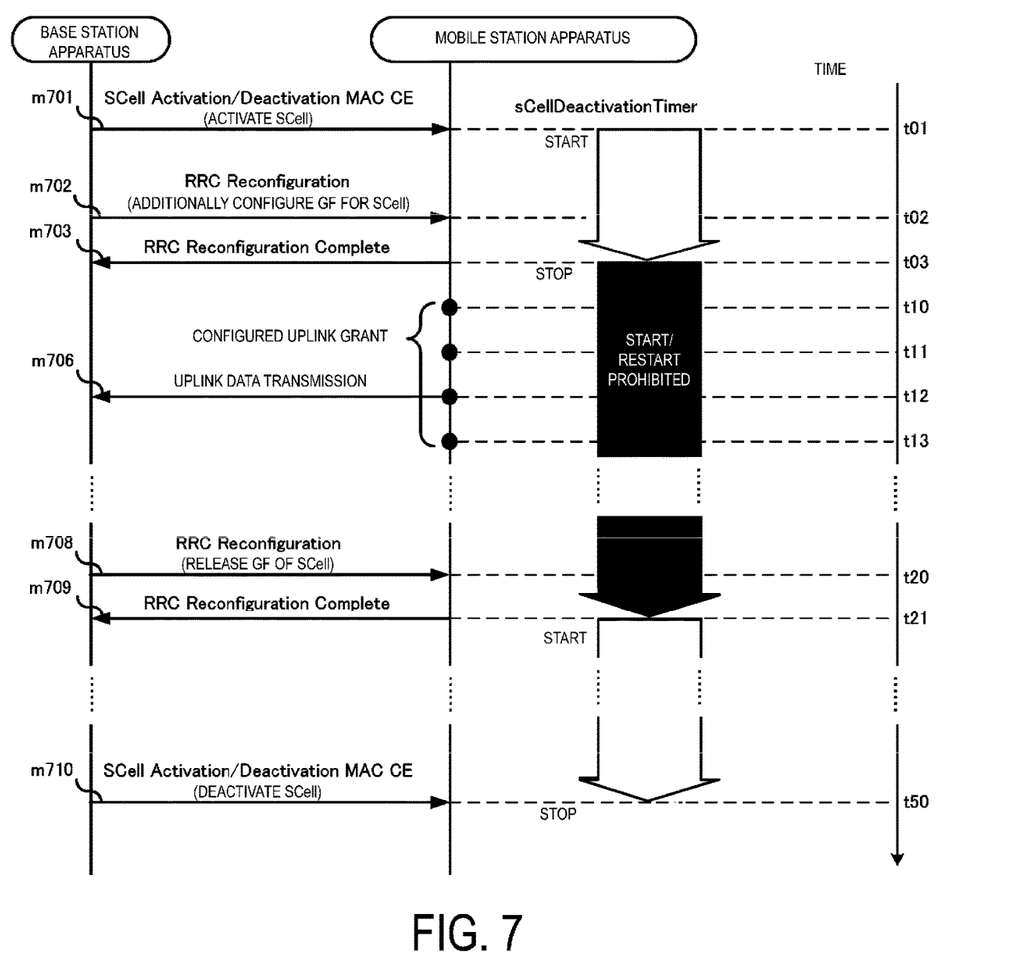
FIG. 7 is a diagram illustrating an example flow of transmission and/or reception of messages and data of a base station apparatus and a mobile station apparatus, and a method for managing an sCellDeactivationTimer in a case of stopping the sCellDeactivationTimer during GF communication according to an aspect of the present invention.

FIG. 7 illustrates an example flow of transmission and/or reception of messages and data of a base station apparatus and a mobile station apparatus at each time, and a method for managing an sCellDeactivationTimer according to the present embodiment. First, a message m701 (SCell Activation/Deactivation MAC CE) for indicating an activation of the SCell is transmitted at time t01 from the base station apparatus to the mobile station apparatus. The mobile station apparatus having received the message m701 activates the SCell and starts the sCellDeactivationTimer. Next, a message m702 (RRC Reconfiguration) for additionally configuring the GE for the SCell is transmitted at time t02 from the base station apparatus to the mobile station apparatus. The mobile station apparatus having received the message m702 performs processing for configuring the GF on the SCell, and transmits a response message m703 (RRC Reconfiguration Complete) in response to the message m702 to the base station apparatus at time t03, and then stops the sCellDeactivationTimer and cause the sCellDeactivationTimer to be in an start/restart prohibition state. In a case that the sCellDeactivationTimer is in the start/restart prohibition state, the sCellDeactivationTimer is not started or restarted in any case that transmission of uplink data and control information or reception of downlink data and control information is performed on the SCell configured as such. Then, in a case that the layer 1 downlink control information m708 for releasing the GF configured on the SCell is transmitted at time t20 from the base station apparatus to the mobile station apparatus, the mobile station apparatus releases the GF configured for the SCell, transmits a response message m709 (RRC Reconfiguration Complete) to the base station apparatus at time t21, and releases the start/restart prohibition state of the sCellDeactivationTimer to start the sCellDeactivationTimer. Then, at time t50, the base station apparatus transmits a message m710 (SCell Activation/Deactivation MAC CE) for deactivating the SCell to the mobile station apparatus. The mobile station apparatus having received the message m710 deactivates the SCell and stops sCellDeactivationTimer.

Note that each message (SCell Activation/Deactivation MAC CE, RRC Reconfiguration, RRC Reconfiguration Complete) is not limited thereto, and other messages may be used as long as they include content for indicating or responding with equivalent operations.

As described above, by applying an aspect of the present invention, the state of a secondary cell can be appropriately managed and unintended cessation of communication can be prevented even during GF communication on the secondary cell.

Fifth Embodiment

Next, as an aspect of the present invention, an example of a procedure in a case of applying to DL-SPS will be explained as a fifth embodiment.

Figure 8:
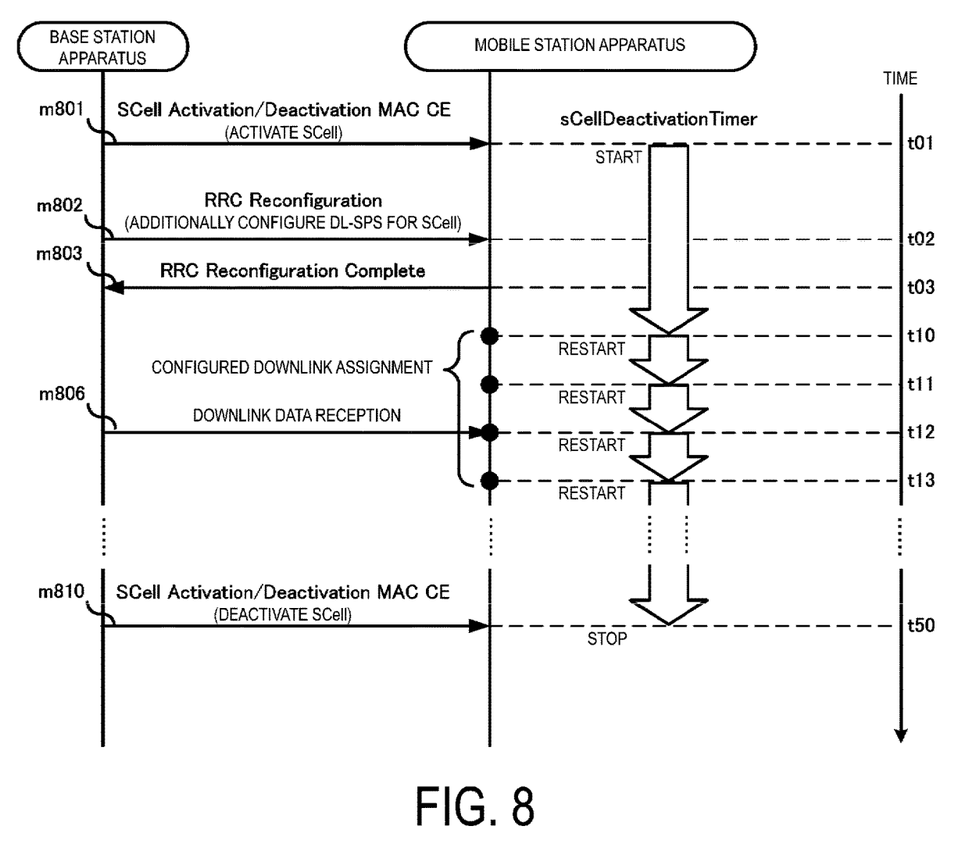
FIG. 8 is a diagram illustrating an example flow of transmission and/or reception of messages and data of a base station apparatus and a mobile station apparatus, and a method for managing an sCellDeactivationTimer in a case of applying to DL-SPS according to an aspect of the present invention.

FIG. 8 illustrates an example flow of transmission and/or reception of messages and data of a base station apparatus and a mobile station apparatus in each time, and a method for managing an sCellDeactivationTimer according to the present embodiment. First, a message m801 (SCell Activation/Deactivation. MAC CE) for indicating an activation of the SCell is transmitted at time t01 from the base station apparatus to the mobile station apparatus. The mobile station apparatus having received the message m801 activates the SCell and starts the sCellDeactivationTimer. Next, a message m802 (RRC Reconfiguration) for additionally configuring the DL-SPS for the SCell is transmitted at time t02 from the base station apparatus to the mobile station apparatus. The mobile station apparatus having received the message m802 performs processing for configuring the DL-SPS on the SCell, and transmits a response message m803 (RRC Reconfiguration Complete) of the message m802 to the base station apparatus at time t03. Then, a configured downlink assignment is generated at each timing (t10, t11, t12, t13) configured by the message m802. Note that, although the generation of the configured uplink grant is illustrated only up to t13 in FIG. 8, the generation of the configured downlink assignment continues after t13 until the DL-SPS is released. In a case that the configured downlink assignment is generated, the mobile station apparatus restarts the sCellDeactivationTimer. Then, at time t50, the base station apparatus transmits a message m810 (SCell Activation/Deactivation MAC CE) for deactivating the SCell to the mobile station apparatus. The mobile station apparatus having received the message m810 deactivates the SCell and stops sCellDeactivationTimer.

Figure 9:
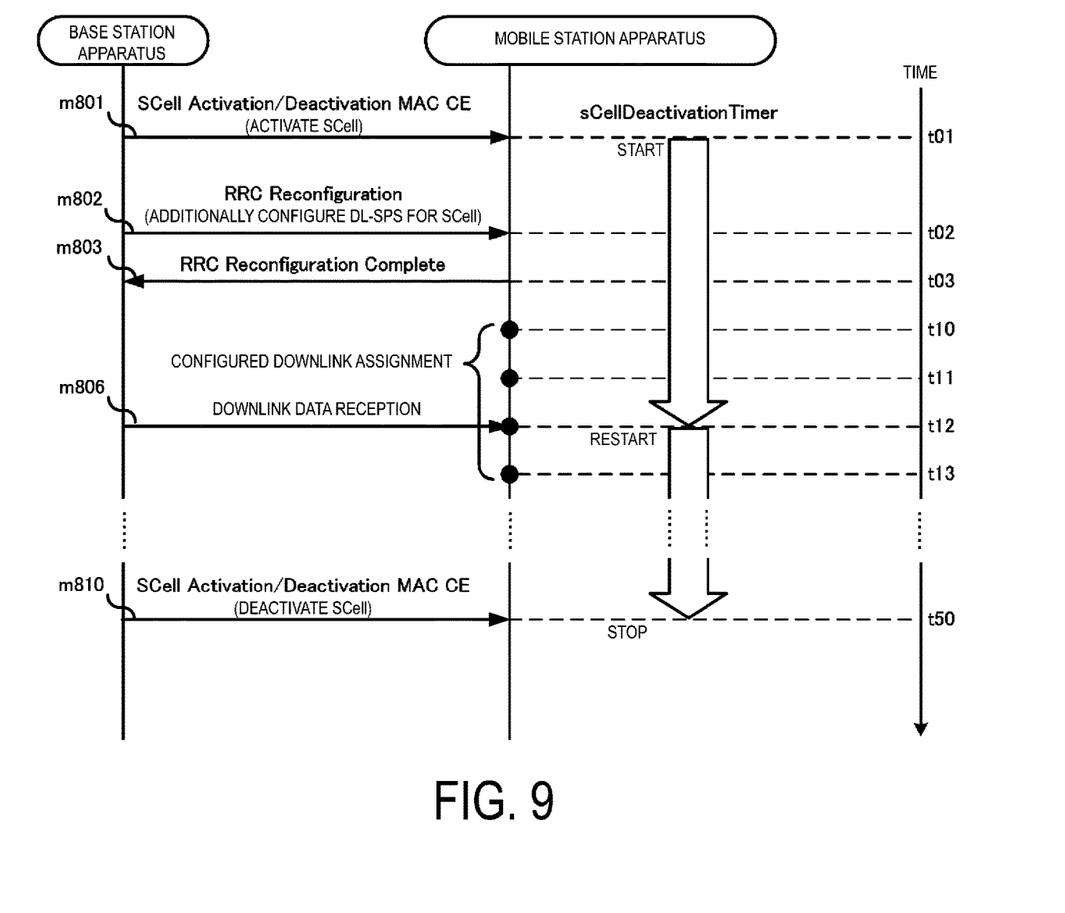
FIG. 9 is a diagram illustrating an example flow of transmission and/or reception of messages and data of a base station apparatus and a mobile station apparatus, and a method for managing an sCellDeactivationTimer in a case of applying to DL-SPS according to an aspect of the present invention.

Note that, as illustrated in FIG. 9, the sCellDeactivationTimer may be restarted only at timing (t12) at which the configured downlink assignment is generated and downlink data reception (message m806) from the base station apparatus is performed. Each message (SCell Activation/Deactivation MAC CE, RRC Reconfiguration, RRC Reconfiguration Complete, Configured Grant Confirmation MAC CE) is not limited thereto, and other messages may be used as long as they include content for indicating or responding with equivalent operations. Restart of the sCellDeactivationTimer may be performed at the transmission and/or reception timing (t02, t03) of the message m802 or m803, or both.

As described above, by applying an aspect of the present invention, the state of a secondary cell can be appropriately managed and unintended cessation of communication can be prevented even during DL-SPS communication on the secondary cell.

Sixth Embodiment

Next, as an aspect of the present invention, a procedure for stopping the sCellDeactivationTimer during DL-SPS communication will be described as a sixth embodiment.

Figure 10:
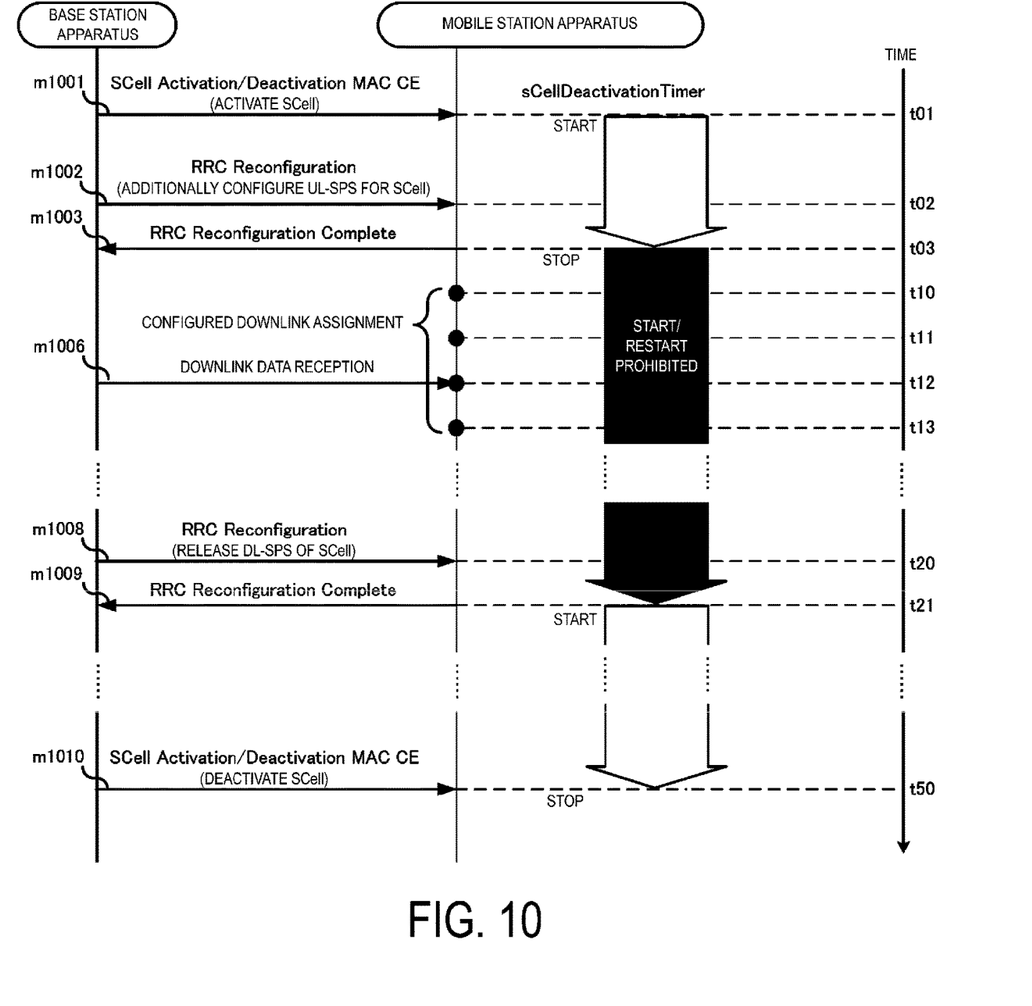
FIG. 10 is a diagram illustrating an example flow of transmission and/or reception of messages and data of a base station apparatus and a mobile station apparatus, and a method for managing an sCellDeactivationTimer in a case of stopping the sCellDeactivationTimer during DL-SPS communication according to an aspect of the present invention.

FIG. 10 illustrates an example flow of transmission and/or reception of messages and data of a base station apparatus and a mobile station apparatus at each time, and a method for managing an sCellDeactivationTimer according to the present embodiment. First, a message m1001 (SCell Activation/Deactivation MAC CE) for indicating an activation of the SCell is transmitted at time t01 from the base station apparatus to the mobile station apparatus. The mobile station apparatus having received the message m1001 activates the SCell and starts the sCellDeactivationTimer. Next, a message m1002 (RRC Reconfiguration) for additionally configuring the DL-SPS for the SCell is transmitted at time t02 from the base station apparatus to the mobile station apparatus. The mobile station apparatus having received the message m1002 performs processing for configuring the DL-SPS on the SCell, and transmits a response message m1003 (RRC Reconfiguration Complete) in response to the message m1002 to the base station apparatus at time t03, and then stops the sCellDeactivationTimer and causes the sCellDeactivationTimer to be in an start/restart, prohibition state. In a case that the sCellDeactivationTimer is in the start/restart prohibition state, the sCellDeactivationTimer is not started or restarted in any case that transmission of uplink data and control information or reception of downlink data and control information is performed on the SCell configured as such. Then, in a case that the layer 1 downlink control information m1008 for releasing the DL-SPS configured on the SCell is transmitted at time t20 from the base station apparatus to the mobile station apparatus, the mobile station apparatus releases the DL-SPS configured to the SCell, transmits a response message m1009 (RRC Reconfiguration Complete) to the base station apparatus at time t21, and releases the start/restart prohibition state of the sCellDeactivationTimer to start the sCellDeactivationTimer. Then, at time t50, the base station apparatus transmits a message m1010 (SCell Activation/Deactivation MAC CE) for deactivating the SCell to the mobile station apparatus.

The mobile station apparatus having received the message m1010 deactivates the SCell and stops sCellDeactivationTimer.

Note that each message (SCell Activation/Deactivation MAC CE, RRC Reconfiguration, RRC Reconfiguration Complete) is not limited thereto, and other messages may be used as long as they include content for indicating or responding with equivalent operations.

As described above, by applying an aspect of the present invention, the state of a secondary cell can be appropriately managed and unintended cessation of communication can be prevented even during DL-SPS communication on the secondary cell.

Note that a communication system, base station apparatus, mobile station apparatus, and communication method that apply the present invention are not limited to the fifth generation communication standard of 3GPP, but may be applied to communication standards used in other communication systems.

Note that a program used for realizing all or some of the functions of the mobile station apparatus and the base station apparatus described above may be recorded on a computer-readable recording medium, and the processing of each unit may be performed by causing a computer system to read and execute the program recorded on the recording medium, Note that the "computer system" here includes an OS and hardware components such as a peripheral device.

The "computer system" includes an environment for supplying a home page (or environment for display) in a case that a WWW system is utilized.

The "computer-readable recording medium" refers to a portable medium such as a flexible disk, a magneto-optical disk, a RUM, a CD-ROM, and the like, and a storage device such as a hard disk built into the computer system. The "computer-readable recording medium" may include a medium, such as a communication line that is used to transmit the program via a network such as the Internet or via a communication line such as a telephone line, that dynamically retains the program for a short period of time, and a medium, such as a volatile memory within the computer system which functions as a server or a client in that case, that retains the program for a fixed period of time. The above-described program may be one for realizing some of the above-described functions, and also may be one capable of realizing the above-described functions in combination with a program already recorded in a computer system.

All or some of the functions of the mobile station apparatus and the base station apparatus may be realized by aggregating the functions into an integrated circuit. Each functional block may be individually realized as chips, or may be partially or completely integrated into a chip. A circuit integration technique is not limited to the LSI, and may be realized with a dedicated circuit or a general-purpose processor. In a case that with advances in semiconductor technology, a circuit integration technology with which an LSI is replaced appears, it is also possible to use an integrated circuit based on the technology.

The embodiments of the present invention have been described in detail above referring to the drawings, but the specific configuration is not limited to the embodiments and includes, for example, an amendment to a design that falls within the scope that does not depart from the gist of the present invention.

INDUSTRIAL APPLICABILITY

The present invention is preferable for use in a wired and wireless communication system or a communication apparatus.

The invention claimed is:

1. A terminal apparatus configured to communicate with a base station apparatus by using a primary cell and a secondary cell, the terminal apparatus comprising:
reception processing circuitry configured to receive downlink data, receive radio resource control (RRC) information including configured uplink grant configuration information for the secondary cell and configured downlink assignment configuration information for the secondary cell, receive downlink control information (DCI), and receive an SCell Activation/Deactivation control element (CE);
transmission processing circuitry configured to transmit uplink data; and
serving cell state managing circuitry configured to:
control an sCellDeactivationTimer with which the secondary cell is configured, and
configure, without scheduling through a physical downlink control channel:
a configured uplink grant based on the configured uplink grant configuration information, and
a configured downlink assignment based on the configured downlink assignment configuration information, wherein
the serving cell state managing circuitry is configured to activate the secondary cell by using the SCell Activation/Deactivation CE and start the sCellDeactivationTimer,
in a case that the transmission processing circuitry transmits the uplink data based on the configured uplink grant, the serving cell state managing circuitry restarts the sCellDeactivationTimer, wherein the serving cell state managing circuitry is configured to configure the configured uplink grant without an activation that uses the DCI.

2. A communication method for a terminal apparatus configured to communicate with a base station apparatus by using a primary cell and a secondary cell, the communication method comprising:
receiving downlink data;
receiving radio resource control (RRC) information including configured uplink grant configuration information for the secondary cell and configured downlink assignment configuration information for the secondary cell;
receiving SCell Activation/Deactivation control element (CE);
receiving downlink control information (DCI):
transmitting uplink data;
controlling an sCellDeactivationTimer with which the secondary cell is configured; and
configuring, without scheduling through a physical downlink control channel:
a configured uplink grant based on the configured uplink grant configuration information, and
a configured downlink assignment based on the configured downlink assignment configuration information, wherein
the secondary cell is activated by using the SCell Activation/Deactivation CE and start the sCellDeactivationTimer,
in a case the uplink data is transmitted based on the configured uplink grant, the sCellDeactivationTimer is restarted, wherein the configured uplink grant is configured without an activation that uses the DCI.

* * * * *